United States Patent
Peterson et al.

(10) Patent No.: US 12,420,708 B2
(45) Date of Patent: Sep. 23, 2025

(54) VEHICULAR CABIN MONITORING SYSTEM WITH CAMERA AT INTERIOR REARVIEW MIRROR ASSEMBLY

(71) Applicant: Magna Mirrors of America, Inc., Holland, MI (US)

(72) Inventors: Austen C. Peterson, Hudsonville, MI (US); Anthony J. Schutz, Warren, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 18/817,442

(22) Filed: Aug. 28, 2024

(65) Prior Publication Data

US 2025/0074308 A1 Mar. 6, 2025

Related U.S. Application Data

(60) Provisional application No. 63/580,035, filed on Sep. 1, 2023.

(51) Int. Cl.
*B60R 1/04* (2006.01)
*B60R 1/12* (2006.01)

(52) U.S. Cl.
CPC .................. *B60R 1/04* (2013.01); *B60R 1/12* (2013.01); *B60R 2001/1253* (2013.01)

(58) Field of Classification Search
CPC ..... B60R 2001/1253; B60R 1/12; B60R 1/04; B60R 2011/0033; B60R 1/29; B60R 1/02
USPC .................................................. 348/148, 141
See application file for complete search history.

(56) References Cited

U.S. PATENT DOCUMENTS

| | | |
|---|---|---|
| 6,318,870 B1 | 11/2001 | Spooner et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,420,756 B2 | 9/2008 | Lynam |
| 7,914,187 B2 | 3/2011 | Higgins-Luthman et al. |
| 9,405,120 B2 | 8/2016 | Graf et al. |
| 10,017,114 B2 | 7/2018 | Bongwald |
| 10,065,574 B2 | 9/2018 | Tiryaki |
| 10,958,830 B2 | 3/2021 | Koravadi |
| 11,007,935 B2 | 5/2021 | Lintz et al. |
| 11,465,561 B2 | 10/2022 | Peterson et al. |
| 11,518,401 B2 | 12/2022 | Kulkarni |

(Continued)

*Primary Examiner* — Sherrie Hsia
(74) *Attorney, Agent, or Firm* — HONIGMAN LLP

(57) ABSTRACT

A vehicular cabin monitoring system includes an interior rearview mirror assembly having a mirror head that accommodates a prismatic mirror reflective element and a camera. The prismatic mirror reflective element is adhesively attached at a mirror back plate of the mirror head. A not-optically-clear adhesive (NOCA) layer is disposed between a mirror reflector coating at a rear side of the prismatic mirror reflective element and the mirror back plate. The camera views through (i) the NOCA layer, (ii) the mirror reflector coating and (iii) the glass substrate of the prismatic mirror reflective element. Electronic circuitry of an electronic control unit (ECU) includes an image processor for processing image data captured by the camera. With the mirror assembly mounted at an interior portion of a vehicle, image data captured by the camera is processed at the ECU for an occupant monitoring function or a driver monitoring function.

31 Claims, 7 Drawing Sheets

(56) References Cited

U.S. PATENT DOCUMENTS

| | | |
|---|---|---|
| 11,582,425 B2 | 2/2023 | Liu |
| 11,639,134 B1 | 5/2023 | Huizen et al. |
| 11,780,372 B2 | 10/2023 | Sobecki et al. |
| 11,827,153 B2 | 11/2023 | Miller et al. |
| 11,930,264 B2 | 3/2024 | Conger et al. |
| 2010/0085653 A1 | 4/2010 | Uken et al. |
| 2016/0137126 A1 | 5/2016 | Fursich et al. |
| 2016/0209647 A1 | 7/2016 | Fursich |
| 2017/0217367 A1 | 8/2017 | Pflug et al. |
| 2017/0274906 A1 | 9/2017 | Hassan et al. |
| 2018/0222414 A1 | 8/2018 | Ihlenburg et al. |
| 2018/0231976 A1 | 8/2018 | Singh |
| 2019/0210615 A1 | 7/2019 | Caron et al. |
| 2020/0143560 A1 | 5/2020 | Lu et al. |
| 2020/0202151 A1 | 6/2020 | Wacquant |
| 2020/0320320 A1 | 10/2020 | Lynam |
| 2021/0291739 A1 | 9/2021 | Kasarla et al. |
| 2021/0323473 A1 | 10/2021 | Peterson et al. |
| 2022/0242438 A1 | 8/2022 | Sobecki et al. |
| 2022/0254132 A1 | 8/2022 | Rother |
| 2022/0377219 A1 | 11/2022 | Conger et al. |
| 2023/0158955 A1 | 5/2023 | Liu et al. |
| 2024/0075878 A1 | 3/2024 | Peterson |
| 2024/0168355 A1 | 5/2024 | Baur |
| 2024/0190456 A1 | 6/2024 | P et al. |
| 2024/0383406 A1 | 11/2024 | Sobecki |

VEHICULAR CABIN MONITORING SYSTEM WITH CAMERA AT INTERIOR REARVIEW MIRROR ASSEMBLY

CROSS REFERENCE TO RELATED APPLICATION

The present application claims the filing benefits of U.S. provisional application Ser. No. 63/580,035, filed Sep. 1, 2023, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a single or double ball pivot or joint mounting configuration where the mirror casing and reflective element are adjusted relative to the interior portion of a vehicle by pivotal movement about the single or double ball pivot configuration. The mirror casing and reflective element are pivotable about either or both of the ball pivot joints by a user that is adjusting a rearward field of view of the reflective element.

SUMMARY OF THE INVENTION

A cabin monitoring system or driving assistance system or vision system or imaging system for a vehicle utilizes one or more cameras (preferably one or more CMOS cameras) to capture image data. The system may include a mirror head adjustably attached at a mounting structure or base. The mounting structure is configured to attach at an interior portion of a vehicle. The mirror head includes a prismatic mirror reflective element. A camera is accommodated by the mirror head. The prismatic mirror reflective element includes a wedge-shaped glass substrate and a mirror reflective coating disposed at a rear side of the wedge-shaped glass substrate. The prismatic mirror reflective element is adhesively attached at a mirror back plate of the mirror head. A not optically clear adhesive (NOCA) layer is disposed between the mirror reflector coating of the prismatic mirror reflective element and the mirror back plate. The camera views through the NOCA layer, the mirror reflector coating of the prismatic mirror reflective element and the glass substrate of the prismatic mirror reflector element. An electronic control unit (ECU) comprises electronic circuitry and associated software, and the electronic circuitry of the ECU comprises an image processor for processing image data captured by the camera. With the mounting structure attached at the interior portion of the vehicle, image data captured by the camera is processed at the ECU for an occupant monitoring function or a driver monitoring function.

These and other objects, advantages, purposes and features of the present invention will become apparent upon review of the following specification in conjunction with the drawings.

DESCRIPTION OF THE PREFERRED EMBODIMENTS

Figure 1:
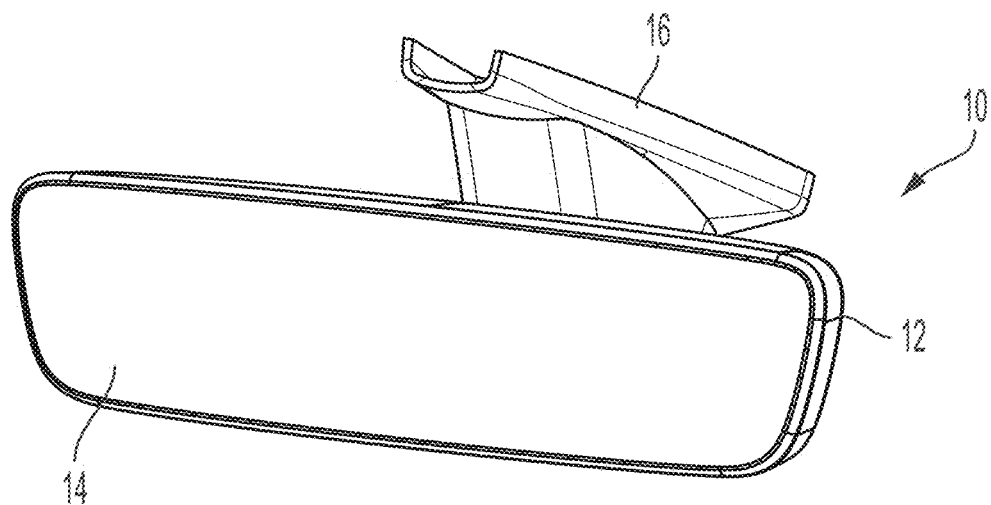
FIG. 1 is a perspective view of an interior rearview mirror assembly having a driver monitoring camera and a near infrared light emitter behind a reflective element of the interior rearview mirror assembly.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, the mirror assembly 10 is configured to be adjustably mounted to an interior portion of an interior cabin of a vehicle (such as to an interior or in-cabin surface of a vehicle windshield or a headliner of a vehicle or the like) via a mounting structure or mounting configuration or assembly 16. The mirror reflective element 14 may comprise a prismatic mirror reflective element that comprises a wedge-shaped glass substrate that can be flipped between a daytime orientation and a nighttime or anti-glare orientation. The system may include a camera 18 disposed behind the mirror reflective element 14 and viewing through the mirror reflective element for capturing image data representative of the interior cabin of the vehicle, including the driver's head region and occupant region of the vehicle cabin. The system may utilize aspects of the driver monitoring systems or occupant monitoring systems described in U.S. Pat. Nos. 11,930,264; 11,827,153; 11,780,372 and/or 11,639,134 and/or International Publication No. WO 2023/220222, which are all hereby incorporated herein by reference in their entireties.

Figure 2:
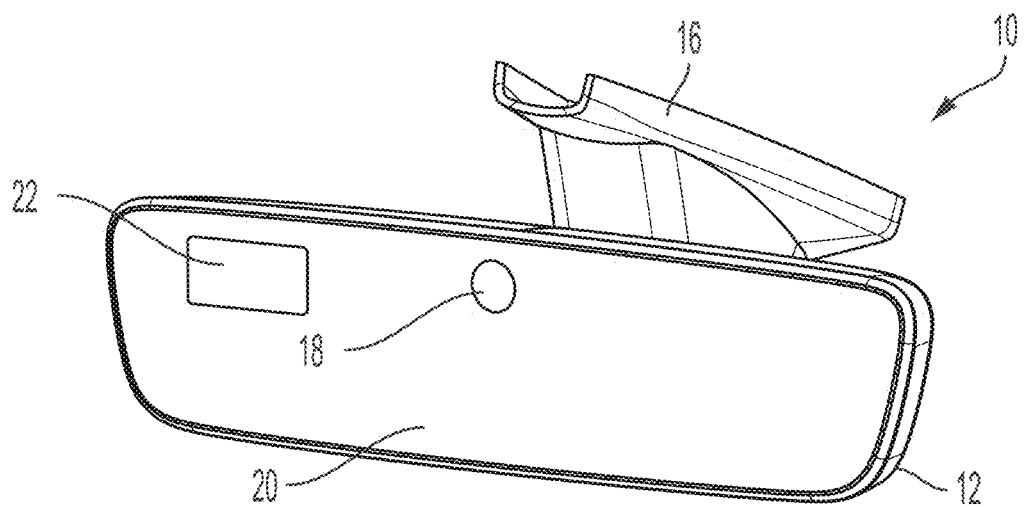
FIG. 2 is another perspective view of the interior rearview mirror assembly, showing the driver monitoring camera and light emitters without the reflective element.

The mirror assembly 10 includes or is associated with a driver monitoring system (DMS) and/or an occupant monitoring system (OMS), with the mirror assembly comprising the driver/occupant monitoring camera 18 disposed at a back plate 20 (and viewing through an aperture of the back plate) behind the reflective element 14 and viewing through the reflective element toward at least a head region of the driver of the vehicle (FIG. 2). The DMS may include one or more infrared (IR) or near infrared (NIR) light emitter(s) 22, which may be disposed at the back plate 20 and may emit light through another aperture of the back plate and through the reflective element.

Figure 3:
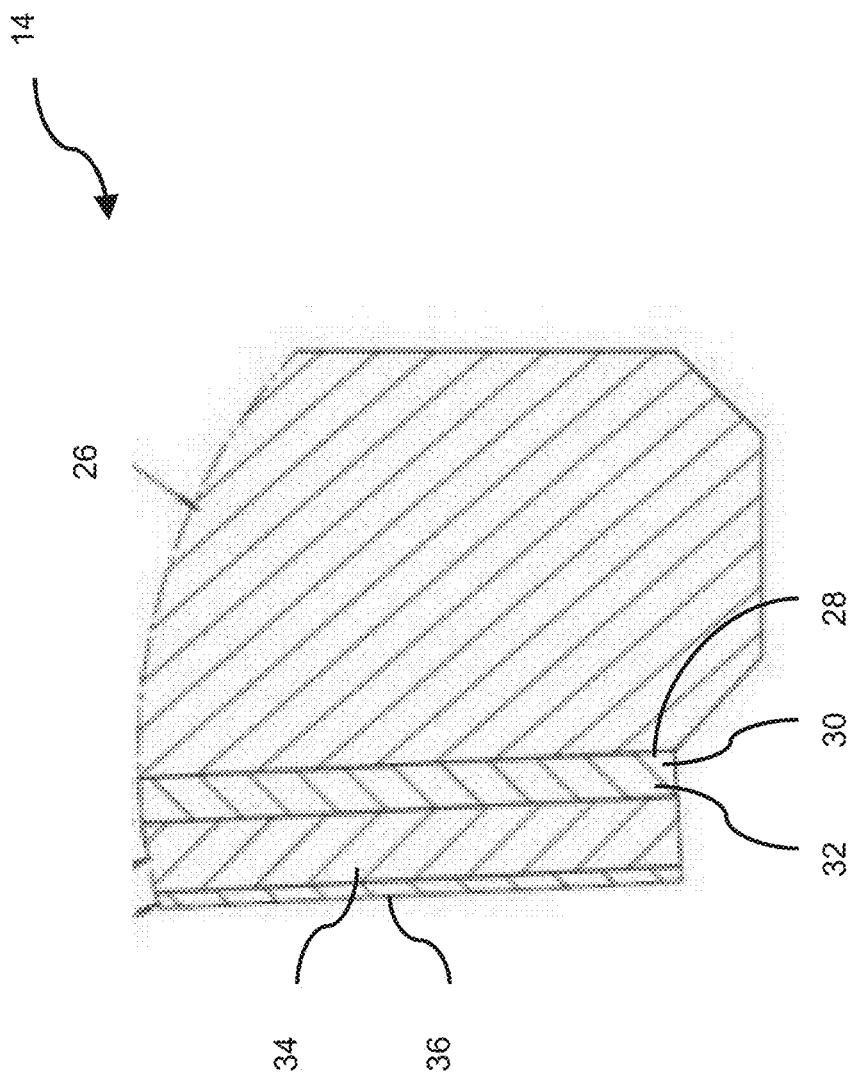
FIG. 3 is a sectional view of a prismatic mirror reflective element of the interior rearview mirror assembly.

Referring to FIG. 3, the prismatic mirror reflective element 14 may include a wedge-shaped glass substrate 26 with a mirror reflector coating 28 configured to provide reflections for the driver to view rearward via the mirror assembly 10. With the mirror assembly attached at the interior portion of the vehicle cabin and a front surface of the glass substrate 26 facing the driver of the vehicle and the cabin of the vehicle, the mirror reflector coating 28 is disposed at an opposite rear surface of the glass substrate 26. The mirror reflector coating 28 may include a multi-layer coating stack. Further, an optically clear adhesive (OCA) 30 and neutral density (ND) filter 32 may be disposed between the mirror reflector coating 28 and a foam tape or adhesive element 34 at the rear surface of the glass substrate 26. The foam tape 34 is configured to adhesively attach the mirror reflective element 14 at the mirror back plate 20. A protective liner 36 may be disposed at a rear surface of the foam tape 34 and removable from the foam tape 34 to attach the foam tape 34 and the mirror reflective element 14 at the mirror back plate 20. With the mirror reflective element 14 attached at the mirror back plate 20, the camera 18 views through the aperture in the mirror back plate 20 and may view through an aperture in the foam tape 34.

An example method of manufacturing the prismatic mirror reflective element 14 may include coating flat glass sheets with the multi-layer reflective coating 28. The coated flat glass sheets may then be cut into strips and the coated flat glass strips may be beveled. The coated beveled glass strips may be laser cut to shape to form the wedge-shaped glass substrate 26. The OCA 30 and the ND filter 32 may be laminated together and de-bubbled. Further, the OCA 30 and ND filter 32 may be die-cut to shape and the die-cut OCA 30 and ND filter 32 may be laminated to the coated beveled glass shapes (i.e., the wedge-shaped glass substrate 26 with the mirror reflective coating 28). The glass sub-assembly (i.e., the glass substrate 26, mirror reflective coating 28, OCA 30, and ND filter 32) may then be de-bubbled and a die-cut foam tape 34 may be adhered to the glass sub-assembly. The mirror reflective element 14 may include characteristics of the prismatic mirror reflective elements described in U.S. Publication No. US-2024-0075878, which is hereby incorporated herein by reference in its entirety.

Figure 4:
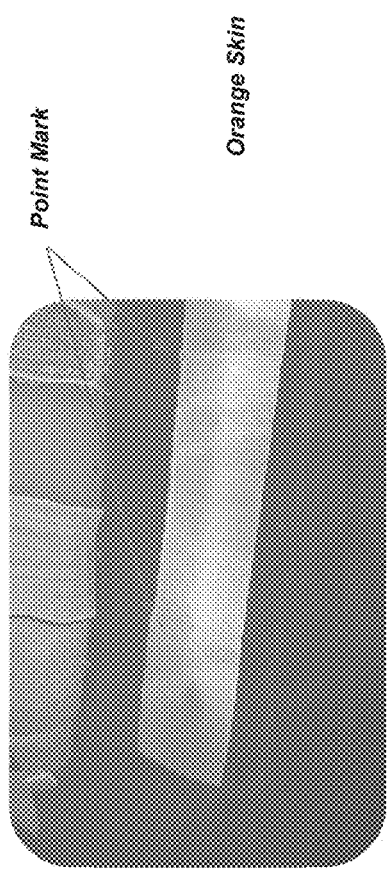
FIGS. 4 and 5 show example surface imperfections in the prismatic mirror reflective element of FIG. 3.
Figure 5:
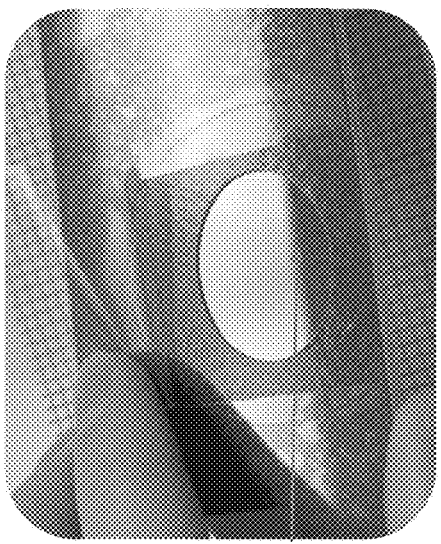
Figure 6:
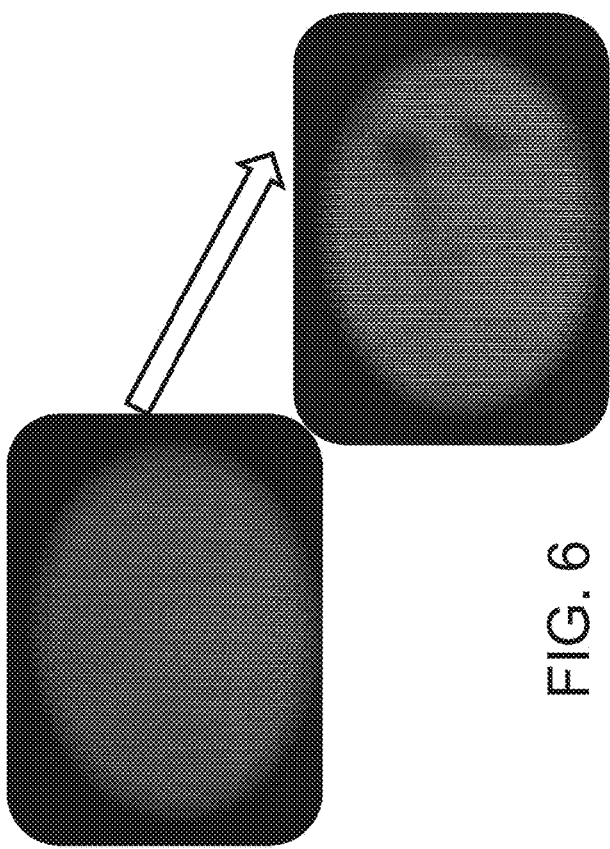
FIG. 6 shows occlusions in images captured by the driver monitoring camera viewing through the prismatic mirror reflective element of FIG. 3.
Figure 7:
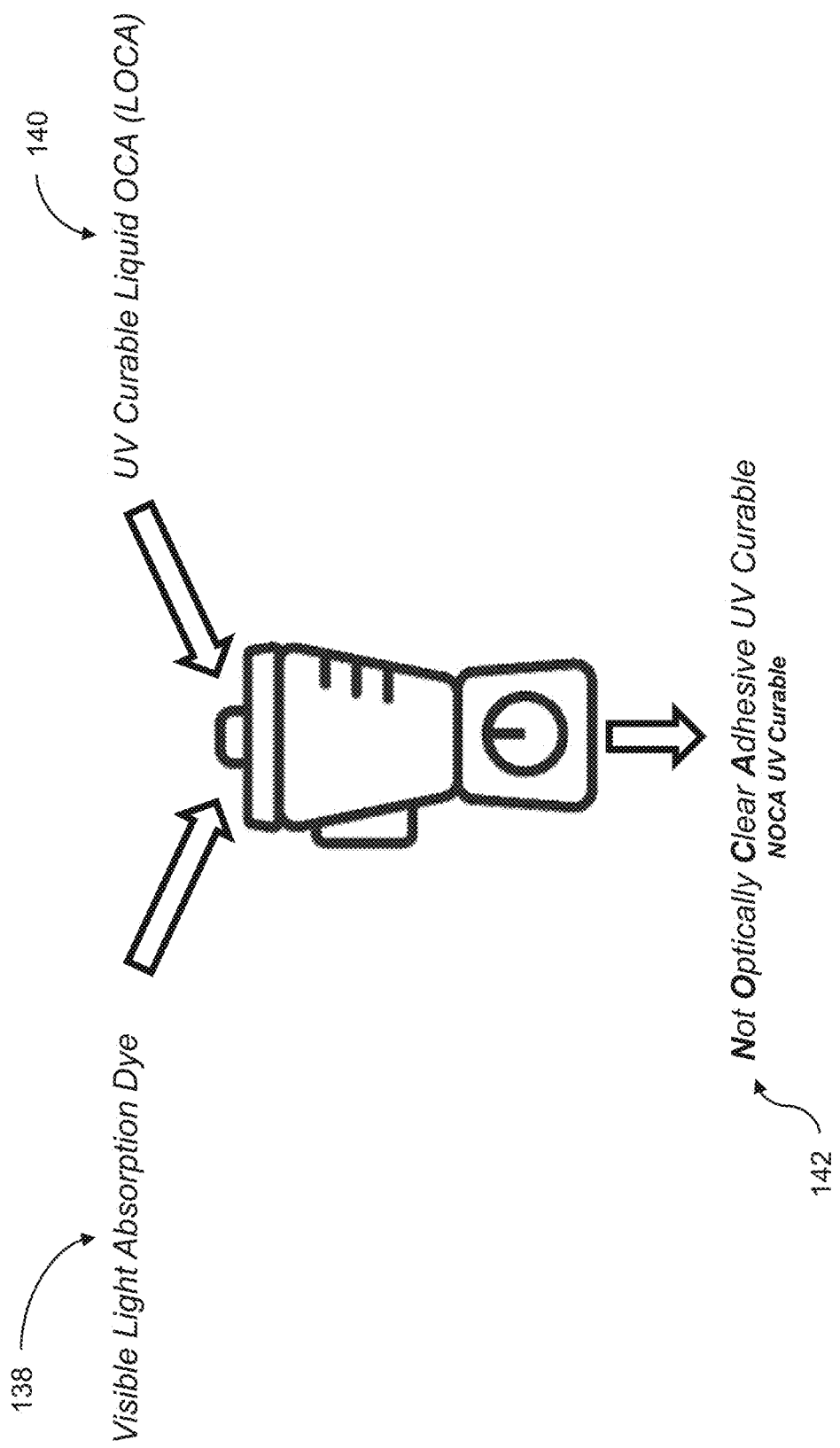
FIG. 7 is a diagram showing visible light absorption dye and ultraviolet (UV) curable liquid optically clear adhesive combined to form UV curable not optically clear adhesive (NOCA)

One or more portions of the example manufacturing method may be prone to quality issues. For example, point marks may form on the ND filter 32 (FIG. 4) and surface roughness or orange skin may form on the laminated assembly (FIG. 5). Thus, and as shown in FIG. 6, quality of image data captured by the camera viewing through the mirror reflective element may be reduced by the point marks or roughened surface. That is, the surface quality issues may cause distortion or occlusion of the image data and therefore reduce the image quality or sharpness of the DMS camera.

Referring to FIGS. 7-10, combining a visible light absorption dye 138 and an ultraviolet (UV) curable liquid OCA (LOCA) 140 may provide a UV curable not-optically-clear adhesive (NOCA) 142 for application at a prismatic glass substrate to provide a mirror reflective element that reduces or eliminates quality issues. That is, a mirror reflective element with a layer of UV curable NOCA 142 may improve the quality of image data captured by the DMS camera viewing through the mirror reflective element. Further, use of the UV curable NOCA 142 may result in cost savings for the mirror reflective element. The layer of UV curable NOCA 142 may be disposed between the multi-layer mirror reflector coating and the foam tape.

The visible light absorption dye 138 is combined with the UV curable LOCA 140 to reduce transmission of visible light incident at the UV curable NOCA 142. For example, the layer of UV curable NOCA 142 may yield visible light transmission of about 50 percent or less, 30 percent or less, 25 percent or less, 20 percent or less, and the like. Transmission of IR and NIR light may not be affected by the UV curable NOCA 142. For example, the NOCA may transmit at least 60 percent of near-infrared light incident at the reflective element, such as at least 80 percent of near-infrared light incident at the reflective element, such as at least 90 percent of near-infrared light incident at the reflective element. The glass and the mirror reflector coating of the mirror reflective element may have a collective visible light transmission rate of about 50 percent or less. Thus, with the layer of NOCA 142 disposed at the mirror reflective element, the glass, the mirror reflector coating and the NOCA 142 may have a collective or full system visible light transmission rate of less than 30 percent, such as between about 20 percent and 30 percent, such as, for example, about 25 percent full system visible light transmission. In other words, between about 20 percent and 30 percent of visible light incident at the mirror reflective element may pass through the glass substrate, the mirror reflector coating, and the layer of NOCA 142. The glass and mirror reflector coating and NOCA may transmit at least 60 percent of near-infrared light incident at the reflective element, such as at least 80 percent of near-infrared light incident at the reflective element, such as at least 90 percent of near-infrared light incident at the reflective element.

Further, the visible light absorption dye 138 acts as a dye rather than a pigment and thus has 100 percent solubility with the UV curable LOCA 140. The visible light absorption dye 138 is a cost efficient solution. For example, the visible light absorption dye 138 may include a powder, such as DT19-29A commercially available from Epolin, LLC of Newark, New Jersey.

The UV curable LOCA 140 provides an index of refraction that may be similar to acrylic, such as an index of refraction of about 1.47. The UV curable LOCA 140 cures when exposed to UV light without distortion, waviness or tack. Further, the UV curable LOCA 140 has a relatively low viscosity and is a cost efficient solution. For example, the UV curable LOCA 140 may include UV curable LOCAs commercially available from Henkel AG & Co. KGaA of Düsseldorf, Germany or Panacol-USA Inc. of Torrington, Connecticut.

Figure 8:
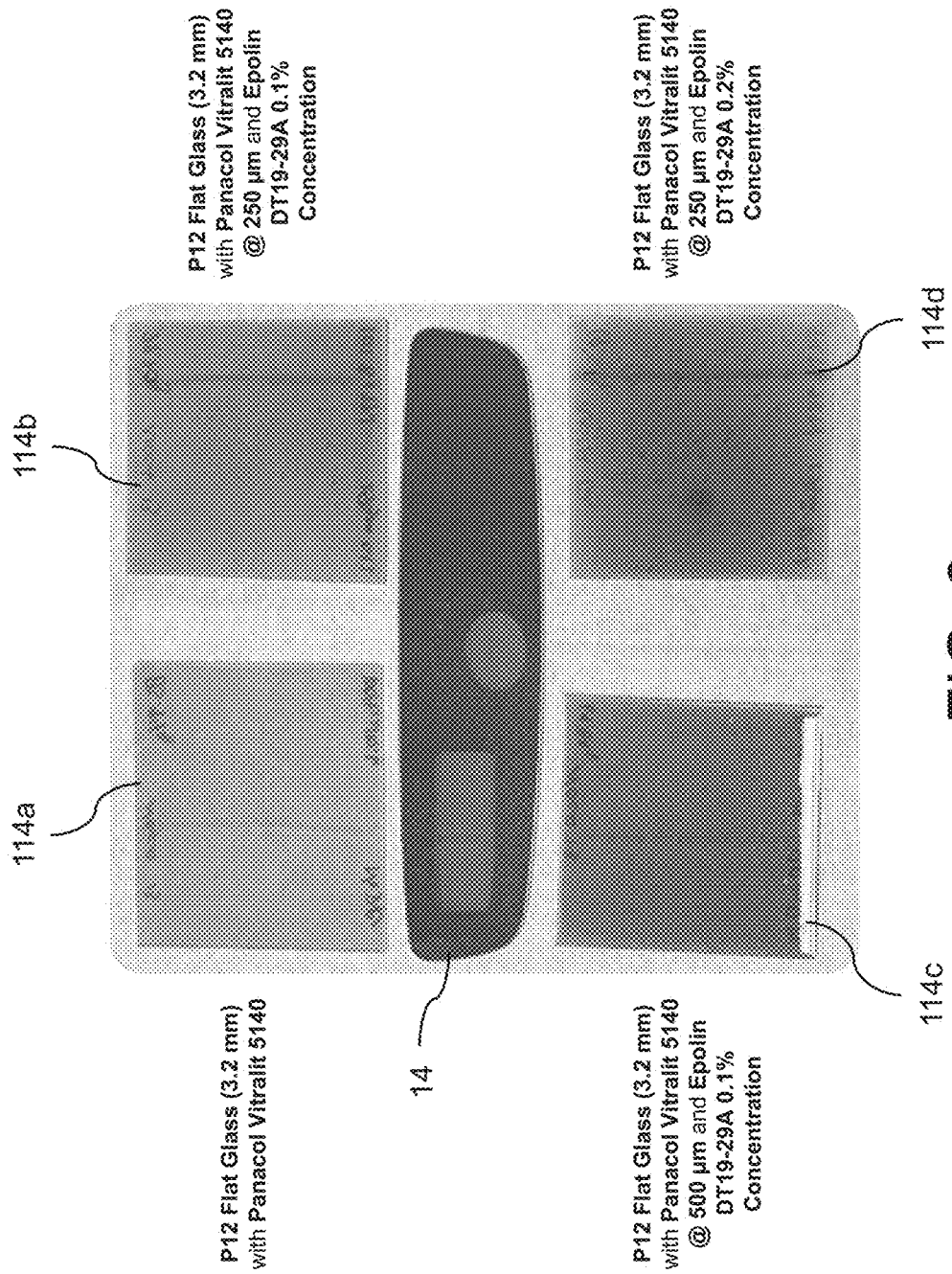
FIG. 8 shows the prismatic mirror reflective element of FIG. 3 and samples of glass substrates that include UV curable NOCA.

FIG. 8 includes the mirror reflective element 14 (with OCA and ND filter) and a plurality of glass samples that include different configurations of the UV curable NOCA 142. For example, a first glass sample 114a may include a flat glass sheet having a thickness of about 3.2 millimeters with a multi-layer mirror reflective coating and a UV curable NOCA 142 that includes a UV curable LOCA 140, such as Panacol VITRALIT® 5140. A second glass sample 114b may include a flat glass sheet having a thickness of about 3.2 millimeters with a multi-layer mirror reflective coating and a UV curable NOCA 142 that includes a UV curable LOCA 140, such as Panacol VITRALIT® 5140, at a thickness of about 250 micrometers and a light absorption dye 138, such as Epolin DT19-29A, at a concentration of about 0.1 percent. A third glass sample 114c may include a flat glass sheet having a thickness of about 3.2 millimeters with a multi-layer mirror reflective coating and a UV curable NOCA 142 that includes a UV curable LOCA 140, such as Panacol VITRALIT® 5140, at a thickness of about 500 micrometers and a light absorption dye 138, such as Epolin DT19-29A, at a concentration of about 0.1 percent. A fourth glass sample 114d may include a flat glass sheet having a thickness of about 3.2 millimeters with a multi-layer mirror reflective coating and a UV curable NOCA 142 that includes a UV curable LOCA 140, such as Panacol VITRALIT® 5140, at a thickness of about 250 micrometers and a light absorption dye 138, such as Epolin DT19-29A, at a concentration of about 0.2 percent.

Figure 9:
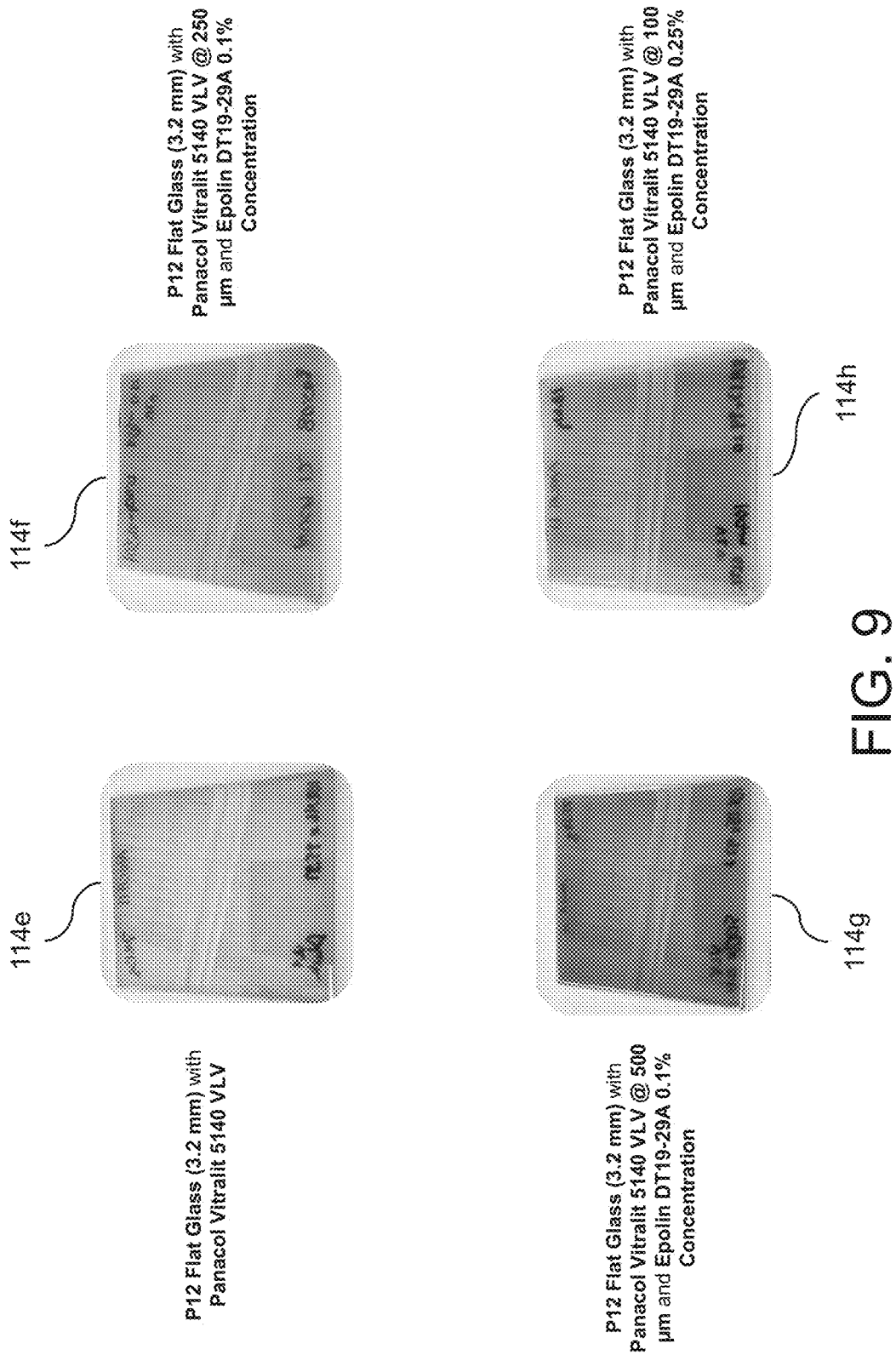
FIG. 9 shows other samples of glass substrates that include UV curable NOCA.

As shown in FIG. 9, a fifth glass sample 114*e* may include a flat glass sheet having a thickness of about 3.2 millimeters with a multi-layer mirror reflective coating and a UV curable NOCA 142 that includes a UV curable LOCA 140, such as Panacol VITRALIT® 5140 VLV. A sixth glass sample 114*f* may include a flat glass sheet having a thickness of about 3.2 millimeters with a multi-layer mirror reflective coating and a UV curable NOCA 142 that includes a UV curable LOCA 140, such as Panacol VITRALIT® 5140 VLV, at a thickness of about 250 micrometers and a light absorption dye 138, such as Epolin DT19-29A, at a concentration of about 0.1 percent. A seventh glass sample 114*g* may include a flat glass sheet having a thickness of about 3.2 millimeters with a multi-layer mirror reflective coating and a UV curable NOCA 142 that includes a UV curable LOCA 140, such as Panacol VITRALIT® 5140 VLV, at a thickness of about 500 micrometers and a light absorption dye 138, such as Epolin DT19-29A, at a concentration of about 0.1 percent. An eighth glass sample 114*h* may include a flat glass sheet having a thickness of about 3.2 millimeters with a multi-layer mirror reflective coating and a UV curable NOCA 142 that includes a UV curable LOCA 140, such as Panacol VITRALIT® 5140 VLV, at a thickness of about 100 micrometers and a light absorption dye 138, such as Epolin DT19-29A, at a concentration of about 0.25 percent.

Figure 10:
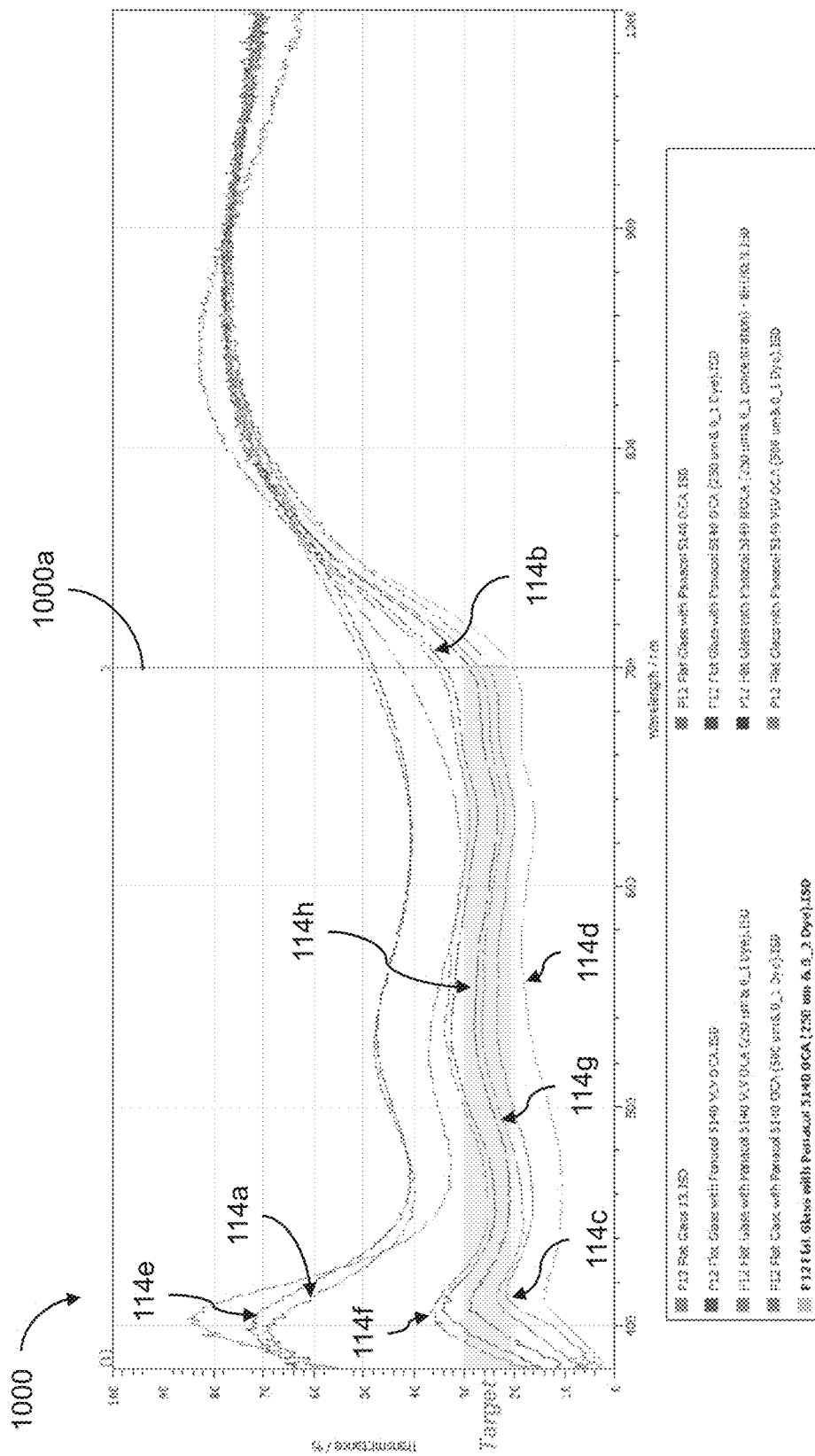
FIG. 10 is a chart showing light transmittance of glass substrates that include UV curable NOCA.

FIG. 10 depicts a graph 1000 that compares the transmittance of the glass samples for different wavelengths of light in the visible spectrum and in the IR and the NIR spectrum. For example, line 1000*a* may separate visible light wavelengths and NIR and IR light wavelengths in the graph 1000 at a wavelength of about 700 nanometers. The visible light spectrum may be measured at wavelengths between about 400 nanometers and 700 nanometers. The NIR and IR light spectrum may be measured at wavelengths greater than about 700 nanometers, such as between about 800 nanometers and 1,000 nanometers. Further, a target transmittance for visible light incident at the mirror reflective element may be between about 20 percent and 30 percent transmittance so that the mirror reflective element having the UV curable NOCA 142 provides for visible light transmittance of between about 20 percent and 30 percent while providing for NIR or IR light transmittance of 20 percent or more, 50 percent or more, 70 percent or more, 90 percent or more and the like. As shown a preferred thickness and die concentration for the UV curable NOCA 142 may include a thickness of about 250 micrometers and a dye concentration of about 0.1 percent, such as included in the second glass sample 114*b* or the sixth glass sample 114*f*, or a thickness of about 100 micrometers and a dye concentration of about 0.25 percent, such as included in the eighth glass sample 114*h*. In other words, the composition of the layer of NOCA 142 at the mirror reflective element may be configured such that the mirror reflective element allows between about 20 percent and 30 percent of visible light incident at the mirror reflective element to pass through the mirror reflective element, and the composition of the layer of NOCA 142 may be configured to achieve the target transmission rate throughout the visible light spectrum.

An example method of manufacturing a prismatic mirror reflective element with a layer of UV curable NOCA 142 may include coating flat glass sheets with the multi-layer reflective coating. The coated flat glass sheets may then be cut into strips and the coated flat glass strips may be beveled. The layer of UV curable NOCA 142 may be sprayed or flooded onto the coated beveled glass strips and then cut, such as laser cut, to form the wedge-shape of the glass substrate. The wedge-shaped glass substrates, that have been laser cut, coated with the multi-layer reflective coating, beveled, and sprayed or flooded with the layer of UV curable NOCA 142 may be broken from the strip. For example, the glass substrates may be manually broken from the strip by an operator. Further, the die cut foam tape is adhered to the glass sub-assembly.

Thus, the prismatic glass substrate may include a multi-layer mirror reflector coating at a rear surface of a wedge-shaped glass substrate. The layer of UV curable NOCA 142 is applied between mirror reflector coating and the foam tape, such as to hide or render covert the foam tape and one or more electronic components within the mirror head, such as the DMS camera and the light emitter. The DMS camera views through the layer of UV curable NOCA 142 and the mirror reflective element, and the layer of UV curable NOCA 142 reduces quality issues in the mirror reflective element such that quality of image data captured by the DMS camera is improved. For example, fewer occlusions or distortions are present in the captured image data.

The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties.

The mirror assembly may include a camera or sensor or light of a driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 11,930,264; 11,827,153; 11,780,372; 11,639,134; 11,582,425; 11,518,401; 10,958,830; 10,065,574; 10,017,114; 9,405,120 and/or 7,914,187, and/or U.S. Publication Nos. US-2024-0168355; US-2024-0190456; US-2023-0158955; US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 18/666,959, filed May 17, 2024 and/or U.S. provisional application Ser. No. 63/641,574, filed May 2, 2024, and/or International Publication No. WO 2023/220222, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular cabin monitoring system, the vehicular cabin monitoring system comprising:
   an interior rearview mirror assembly comprising a mirror head adjustable about a mounting structure, wherein the mounting structure is configured to mount the interior rearview mirror assembly at an interior portion of an interior cabin of a vehicle;
   wherein the mirror head accommodates a mirror reflective element;
   wherein the mirror head accommodates a camera, and wherein, with the interior rearview mirror assembly mounted at the interior portion of the interior cabin of the vehicle, the camera views within the interior cabin of the vehicle;
   wherein the mirror reflective element comprises a glass substrate having a front side and a rear side, and wherein, with the interior rearview mirror assembly mounted at the interior portion of the interior cabin of the vehicle, the front side of the glass substrate is closer to a driver of the vehicle than the rear side, and wherein a mirror reflector is disposed at the rear side of the glass substrate;
   wherein the mirror reflective element is adhesively attached at a mirror back plate of the mirror head;
   wherein a not-optically-clear-adhesive (NOCA) layer is disposed between the mirror reflector and the mirror back plate;
   wherein the camera is accommodated by the mirror head behind the mirror reflective element, and wherein the camera views through (i) the NOCA layer, (ii) the mirror reflector and (iii) the glass substrate of the mirror reflective element;
   wherein the camera is operable to capture image data;
   an electronic control unit (ECU);
   wherein image data captured by the camera is transferred to the ECU;
   wherein the ECU comprises electronic circuitry and associated software, and wherein the electronic circuitry of the ECU comprises an image processor operable to process image data transferred to the ECU; and
   wherein, with the interior rearview mirror assembly mounted at the interior portion of the interior cabin of the vehicle, image data captured by the camera is processed at the ECU for at least one selected from the group consisting of (i) an occupant monitoring function and (ii) a driver monitoring function.

2. The vehicular cabin monitoring system of claim 1, wherein the NOCA layer attenuates at least a portion of visible light incident at the NOCA layer, and wherein the NOCA layer transmits at least a portion of near infrared (NIR) light incident at the NOCA layer.

3. The vehicular cabin monitoring system of claim 1, wherein the NOCA layer comprises a visible light transmission rate that is less than or equal to 50 percent.

4. The vehicular cabin monitoring system of claim 1, wherein the glass substrate and the mirror reflector collectively comprise a visible light transmission rate that is less than or equal to 50 percent.

5. The vehicular cabin monitoring system of claim 1, wherein the NOCA layer, the glass substrate and the mirror reflector collectively comprise a visible light transmission rate between 20 percent and 30 percent.

6. The vehicular cabin monitoring system of claim 1, wherein the NOCA layer, the glass substrate and the mirror reflector collectively comprise a near-infrared light transmission rate of greater than 80 percent.

7. The vehicular cabin monitoring system of claim 1, wherein the NOCA layer comprises a visible light absorption dye and an optically clear adhesive (OCA).

8. The vehicular cabin monitoring system of claim 7, wherein concentration of the visible light absorption dye is less than or equal to 0.25 percent.

9. The vehicular cabin monitoring system of claim 7, wherein concentration of the visible light absorption dye is less than or equal to 0.2 percent.

10. The vehicular cabin monitoring system of claim 9, wherein concentration of the visible light absorption dye is less than or equal to 0.1 percent.

11. The vehicular cabin monitoring system of claim 1, wherein thickness of the NOCA layer is less than or equal to 500 micrometers.

12. The vehicular cabin monitoring system of claim 1, wherein thickness of the NOCA layer is less than or equal to 250 micrometers.

13. The vehicular cabin monitoring system of claim 1, wherein thickness of the NOCA layer is less than or equal to 100 micrometers.

14. The vehicular cabin monitoring system of claim 1, wherein a light emitter is accommodated by the mirror head, and wherein the light emitter is operable, when electrically powered to emit light, to emit near infrared (NIR) light.

15. The vehicular cabin monitoring system of claim 14, wherein the light emitter is accommodated by the mirror head behind the mirror reflective element, and wherein the light emitter, when electrically powered to emit light, emits light that passes through (i) the NOCA layer, (ii) the mirror reflector and (iii) the glass substrate of the mirror reflective element.

16. The vehicular cabin monitoring system of claim 1, wherein the mirror reflective element is adhesively attached at the mirror back plate of the mirror head via foam tape, and wherein the camera views through an aperture of the foam tape.

17. A vehicular cabin monitoring system, the vehicular cabin monitoring system comprising:
   an interior rearview mirror assembly comprising a mirror head adjustable about a mounting structure, wherein the mounting structure is configured to mount the interior rearview mirror assembly at an interior portion of an interior cabin of a vehicle;
   wherein the mirror head accommodates a prismatic mirror reflective element;
   wherein the mirror head accommodates a camera, and wherein, with the interior rearview mirror assembly mounted at the interior portion of the interior cabin of the vehicle, the camera views within the interior cabin of the vehicle;
   wherein the prismatic mirror reflective element comprises a wedge-shaped glass substrate having a front side and a rear side, and wherein, with the interior rearview mirror assembly mounted at the interior portion of the interior cabin of the vehicle, the front side of the wedge-shaped glass substrate is closer to a driver of the vehicle than the rear side, and wherein a mirror reflector is disposed at the rear side of the wedge-shaped glass substrate;

wherein the prismatic mirror reflective element is adhesively attached at a mirror back plate of the mirror head;

wherein a not-optically-clear-adhesive (NOCA) layer is disposed between the mirror reflector and the mirror back plate;

wherein the NOCA layer attenuates at least a portion of visible light incident at the NOCA layer, and wherein the NOCA layer transmits at least a portion of near infrared (NIR) light incident at the NOCA layer;

wherein the camera is accommodated by the mirror head behind the prismatic mirror reflective element, and wherein the camera views through (i) the NOCA layer, (ii) the mirror reflector and (iii) the wedge-shaped glass substrate of the prismatic mirror reflective element;

wherein the camera is operable to capture image data;

an electronic control unit (ECU);

wherein image data captured by the camera is transferred to the ECU;

wherein the ECU comprises electronic circuitry and associated software, and wherein the electronic circuitry of the ECU comprises an image processor operable to process image data transferred to the ECU; and wherein, with the interior rearview mirror assembly mounted at the interior portion of the interior cabin of the vehicle, image data captured by the camera is processed at the ECU for at least one selected from the group consisting of (i) an occupant monitoring function and (ii) a driver monitoring function.

18. The vehicular cabin monitoring system of claim 17, wherein the NOCA layer comprises a visible light transmission rate that is less than or equal to 50 percent.

19. The vehicular cabin monitoring system of claim 17, wherein the wedge-shaped glass substrate and the mirror reflector collectively comprise a visible light transmission rate that is less than or equal to 50 percent.

20. The vehicular cabin monitoring system of claim 17, wherein the NOCA layer, the wedge-shaped glass substrate and the mirror reflector collectively comprise a visible light transmission rate between 20 percent and 30 percent.

21. The vehicular cabin monitoring system of claim 17, wherein the NOCA layer, the wedge-shaped glass substrate and the mirror reflector collectively comprise a near-infrared light transmission rate of greater than 80 percent.

22. The vehicular cabin monitoring system of claim 17, wherein the NOCA layer comprises a visible light absorption dye and an optically clear adhesive (OCA).

23. The vehicular cabin monitoring system of claim 17, wherein a light emitter is accommodated by the mirror head, and wherein the light emitter is operable, when electrically powered to emit light, to emit near infrared (NIR) light.

24. The vehicular cabin monitoring system of claim 23, wherein the light emitter is accommodated by the mirror head behind the prismatic mirror reflective element, and wherein the light emitter, when electrically powered to emit light, emits light that passes through (i) the NOCA layer, (ii) the mirror reflector and (iii) the wedge-shaped glass substrate of the prismatic mirror reflective element.

25. The vehicular cabin monitoring system of claim 17, wherein the prismatic mirror reflective element is adhesively attached at the mirror back plate of the mirror head via foam tape, and wherein the camera views through an aperture of the foam tape.

26. A vehicular cabin monitoring system, the vehicular cabin monitoring system comprising:

an interior rearview mirror assembly comprising a mirror head adjustable about a mounting structure, wherein the mounting structure is configured to mount the interior rearview mirror assembly at an interior portion of an interior cabin of a vehicle;

wherein the mirror head accommodates a prismatic mirror reflective element;

wherein the mirror head accommodates a camera, and wherein, with the interior rearview mirror assembly mounted at the interior portion of the interior cabin of the vehicle, the camera views within the interior cabin of the vehicle;

wherein the mirror head accommodates a light emitter, and wherein the light emitter is operable, when electrically powered to emit light, to emit near infrared (NIR) light;

wherein the prismatic mirror reflective element comprises a wedge-shaped glass substrate having a front side and a rear side, and wherein, with the interior rearview mirror assembly mounted at the interior portion of the interior cabin of the vehicle, the front side of the wedge-shaped glass substrate is closer to a driver of the vehicle than the rear side, and wherein a mirror reflector is disposed at the rear side of the wedge-shaped glass substrate;

wherein the prismatic mirror reflective element is adhesively attached at a mirror back plate of the mirror head;

wherein a not-optically-clear-adhesive (NOCA) layer is disposed between the mirror reflector and the mirror back plate;

wherein the NOCA layer comprises a visible light absorption dye and an optically clear adhesive (OCA);

wherein the camera is accommodated by the mirror head behind the prismatic mirror reflective element, and wherein the camera views through (i) the NOCA layer, (ii) the mirror reflector and (iii) the wedge-shaped glass substrate of the prismatic mirror reflective element;

wherein the light emitter is accommodated by the mirror head behind the prismatic mirror reflective element, and wherein the light emitter, when electrically powered to emit light, emits light that passes through (i) the NOCA layer, (ii) the mirror reflector and (iii) the wedge-shaped glass substrate of the prismatic mirror reflective element;

wherein the camera is operable to capture image data;

an electronic control unit (ECU);

wherein image data captured by the camera is transferred to the ECU;

wherein the ECU comprises electronic circuitry and associated software, and wherein the electronic circuitry of the ECU comprises an image processor operable to process image data transferred to the ECU; and wherein, with the interior rearview mirror assembly mounted at the interior portion of the interior cabin of the vehicle, image data captured by the camera is processed at the ECU for at least one selected from the group consisting of (i) an occupant monitoring function and (ii) a driver monitoring function.

27. The vehicular cabin monitoring system of claim 26, wherein the NOCA layer attenuates at least a portion of visible light incident at the NOCA layer, and wherein the NOCA layer transmits at least a portion of near infrared (NIR) light incident at the NOCA layer.

28. The vehicular cabin monitoring system of claim 26, wherein the NOCA layer, the wedge-shaped glass substrate and the mirror reflector collectively comprise a visible light transmission rate between 20 percent and 30 percent.

29. The vehicular cabin monitoring system of claim 26, wherein the NOCA layer, the wedge-shaped glass substrate and the mirror reflector collectively comprise a near-infrared light transmission rate of greater than 80 percent.

30. The vehicular cabin monitoring system of claim 26, wherein concentration of the visible light absorption dye is less than or equal to 0.25 percent.

31. The vehicular cabin monitoring system of claim 26, wherein thickness of the NOCA layer is less than or equal to 500 micrometers.

* * * * *